United States Patent [19]

Tseng

[11] Patent Number: 4,896,750
[45] Date of Patent: Jan. 30, 1990

[54] BICYCLE BRAKE CABLE TENSION ADJUSTMENT

[76] Inventor: Shih-Ming Tseng, No. 18-12, Lane 503, Chung Chen Rd. Sec. 2,, Changhua City, Taiwan

[21] Appl. No.: 277,665

[22] Filed: Nov. 29, 1988

[51] Int. Cl.$^4$ .............................................. B62L 1/14
[52] U.S. Cl. ............................. 188/24.19; 74/501.5 R
[58] Field of Search ............ 74/501.5 R, 502.4, 502.6; 188/24.19, 24.21, 24.22, 196 M, 196 P

[56] References Cited

U.S. PATENT DOCUMENTS

| | | | |
|---|---|---|---|
| 2,616,139 | 11/1952 | Von Wold et al. | 74/501.5 X |
| 2,671,253 | 3/1954 | Hensley | 74/501.5 X |
| 4,143,745 | 3/1979 | Yoshikawa | 188/24.21 |
| 4,464,950 | 8/1984 | Deligny | 74/501.5 R |

Primary Examiner—Duane A. Reger
Attorney, Agent, or Firm—Browdy & Neimark

[57] ABSTRACT

A bicycle brake cable tension adjustment device permits the adjustment of the brake cable only in one direction and limits the movement of the same in the other. The present disclosure includes a suspension member having a vertical wall and a horizontal wall on each of which is provided a through hole, and an adjustment assembly mounted on the horizontal wall of the suspension member and a cable fixing assembly mounted on the vertical wall of the same. The adjustment assembly includes a bolt-like member having a through hole in the axial direction which is provided with a tapered inner wall with the diameter thereof gradually increased from the top to the bottom, and a spring biased guiding tube having a conic bottom end with two or three symmetrically-located steel balls disposed in through holes defined on the periphery of the conic bottom end which is in corresponding abutment with the tapered surface of the bolt-like member. A brake actuating cable is guided through the bolt-like member and the the guiding tube and is in contact with the steel balls, therefore, once the guiding tube is moved upward against the inner tapered surface of the bolt-like member, the steel balls will be pushed radially inward to clamp on the brake actuating cable, restraining the same to move; and by pushing downward the spring biased guiding tube, the conic bottom end will disengage with the tapered surface so to release the cable from the clamping of the steel balls, permitting the same to be pulled in either direction for adjustment.

2 Claims, 4 Drawing Sheets

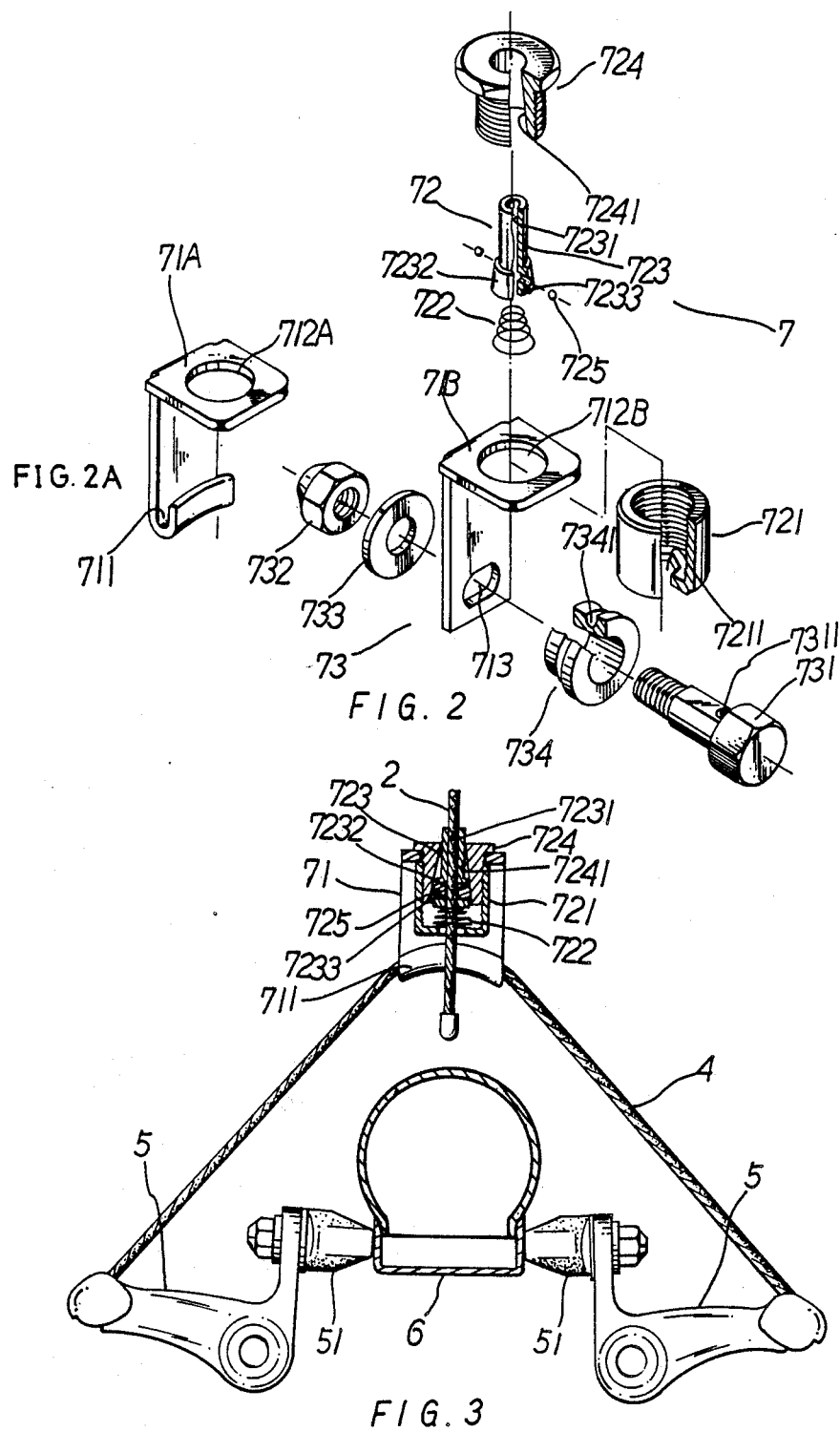

BICYCLE BRAKE CABLE TENSION ADJUSTMENT

BACKGROUND OF THE INVENTION

The present invention relates to a brake cable tension adjustment device for use on bicycles or vehicles of the like.

Conventionally, bicycle brakes are equipped with a pair of pivotal brake units each having a friction pad disposed at one end thereof. The brake units are operatively connected at other ends to each other by means of a suspension cable part of which is located in a groove of a cable suspension plate as shown in FIG. 1. As long as the suspension plate is actuated to lift up by a brake actuating cable coupled to the hand brake of the bicycle, the brake units are pivotally and simultaneously actuated to make the friction pads come into friction contact with the rims of the wheel to slow down the rotation of the same.

However, the traditional way of operating the bicycle brake is not satisfactory enough from the operation safety point of view, because the cable suspension plate is apt to become tilted as a result of long term operation, thus making the pivotal brake unit not respond sufficiently quickly and effectively, moreover, the detachment of the brake actuating cable from the groove of the cable suspension plate makes the riding of the bicycle dangerous due to the possibility of total loss of control of this vehicle.

Furthermore, the adjustment of the tension of the brake actuating cable can not be done in a convenient way; and tools such as screw drivers and spanners are needed to carry out the operation.

The present inventor has noticed the disadvantages with the conventional bicycle brake system and devoted his time to the provision of an improved brake control and cable tension adjustment device of the present invention.

SUMMARY OF THE INVENTION

Therefore, the primary object of the present invention is to provide a brake cable tension adjustment device which permits the brake actuating cable to extend only in one direction and which restrains name in the reverse direction so that the bicycle rider can effect the brake cable adjustment in a ready and secure manner.

One further object of the present invention is to provide a brake cable tension adjustment device which can securely locate the brake actuating cable in place and prevent the same from detaching from its suspension plate.

One still further object of the present invention is to provide a brake cable tension adjustment device which can avoid the tilt of the cable suspension member due to long term operation. Thus, the brake units are always kept symmetrically in place, making the brake operation effective and secure.

To make the present invention easily understandable, the structure, operation modes and features of the same are given in a number of drawings in company with a detailed description of the preferred embodiments thereof, in which:

BRIEF DESCRIPTION OF THE DRAWINGS

FIG. 2 is a diagram showing a cable fixing plate and the exploded structural components of the present invention;

FIG. 2A shows a variation of FIG. 2;

FIG. 3 is a diagram showing the structural arrangement of the first type of cable suspension plate of the present invention in operative cooperation with other related components;

DETAILED DESCRIPTION OF THE PREFERRED EMBODIMENT

Figure 1:
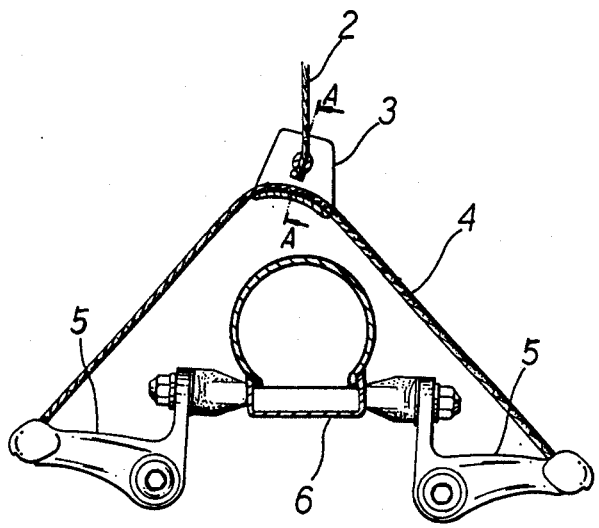
FIG. 1 is a diagram showing the structure of a conventional brake operating device.
Figure 1A:
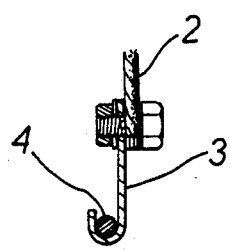
FIG. 1A is a diagram showing the sectional view of the fixing plate of the brake acutating cable of FIG. 1.
Figure 4:
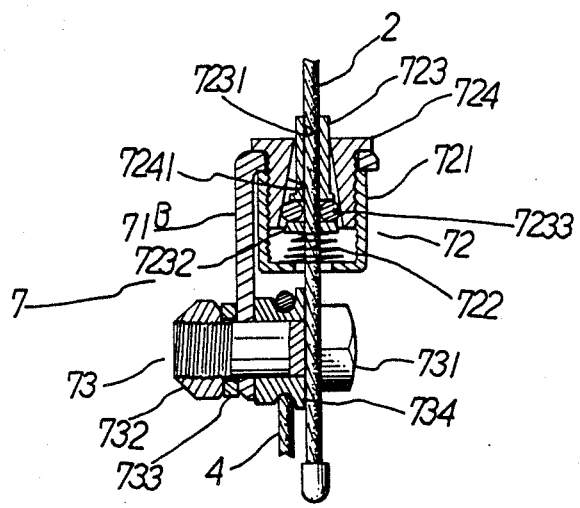
FIG. 4 is a sectional view showing the structural arrangement of the second type of cable suspension plate of the present invention in cooperation with other related components.

Referring to FIG. 2, a centrally located and symmetrically operated bicycle brake operation and cable tension adjustment device of the present invention is shown by way of its exploded components. The present device 71, an adjustment assembly 72, and a cable fixing assembly 73 both of which are mounted on the suspension member 71A or 71B, are shown in FIGS. 3, 4.

The suspension member 71 has two types of structure as illustrated in FIG. 2 and FIG. 2A. The first kind of suspension member 71A has a vertical wall and an upper horizontal wall with a central hole 712A disposed thereon, and the lower end of the vertical wall is reversely bent toward the upper horizontal wall, forming a groove 711. The second alternative 71B has the same vertical and horizontal walls as the first kind of suspension member 71A, except the groove 711 is replaced by an oval-shaped hole 713 disposed near the lower end of the vertical wall.

The hole 712A or 712B on the horizontal wall of suspension member permits the passage of the adjustment assembly 72 in mounting operation; similarly the oval hole 713 on the vertical wall permits the location of the cable fixing assembly 73.

The adjustment assembly 72 further comprises a tubular casing 721 having threads disposed on the inner wall thereof, the bottom through hole 7211 being slightly smaller than the upper through hole thereof, thereby forming a flange portion for the location of a coil spring 722 in assembly. On top of the coil spring 722 is disposed a cable guiding tube 723 having a through hole 7231 and a conic bottom end 7232 with the larger end of the cone located at the bottom, as shown in FIGS. 2, 3. A bolt-like member 724 having external threads and a through hole 7241 having tapered inner wall is in agreement with the conic end of the guiding tube 723. The bolt-like member 724 is screwed to the tubular casing 721 which is located through the hole 712A or 712B. The flanged upper portion of the bolt-like member 724 is in contact engagement with the periphery of the horizontal hole 712A or 712B so to support the whole adjustment assembly in place, as shown in FIGS. 3, 4.

On the wall of the conic end of the guiding tube 723 are disposed two or three symmetric bores 7233 in communication with the through hole 7231; two or three steel balls 725 are located respectively in the bores 7233. An elongate brake actuating cable 2 is guided through the respective through holes of the adjustment assembly 72 with the bottom end thereof extended externally, and a bulged stop means is located at the bottom end thereof.

Figure 5:
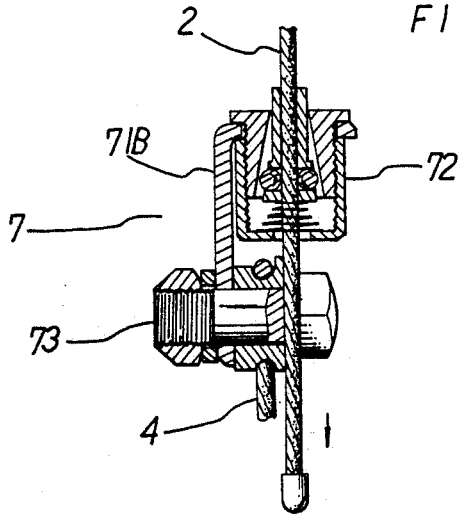
FIG. 5 is a diagram showing the operation mode of the invention, wherein a pair of steel balls are in abutment against the brake actuating cable to frictionally restrain the same to move.
Figure 6:
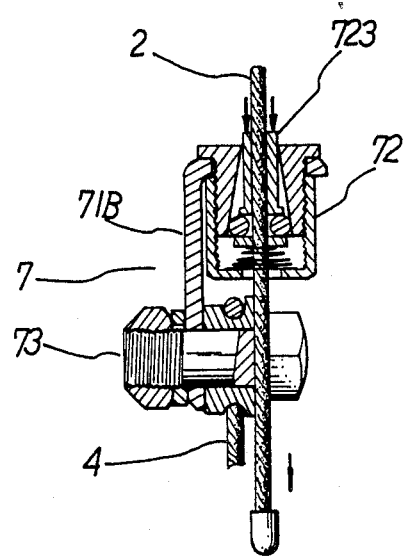
FIG. 6 is a diagram in contrast to the operation of FIG. 5, wherein the pair of steel balls are actuated to be out of abutting engagement with the brake actuating cable permitting the same to move.
Figure 7:
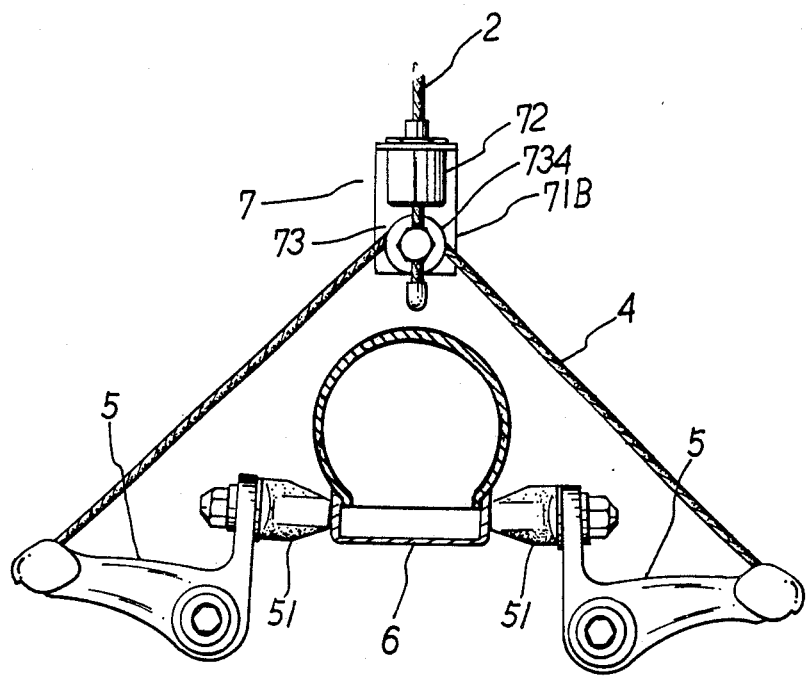
FIG. 7 is a diagram showing the whole structural arrangement of the present invention, using the second type of cable fixing plate.

As shown from FIG. 4 to FIG. 6, the steel balls 725 are in contact with the brake actuating cable 2 through the bores 7233 as long as the coil spring 722 located under the guiding tube 723 supports and urges the guiding tube 723 upward. When the brake actuating cable 2 is pulled downward, the guiding tube 723 is simultaneously brought along downward, making the conic bottom end 7232 of the guiding tube 723 disengage from the tapered wall of the through hole 7241. Thus the steel balls 725 will release the clamped cable 2.

It is clearly seen in FIG. 6, the push down of the guiding tube 723 can facilitate the downward motion of the cable 2.

The pull in the upward direction of the brake actuating cable 2 will simultaneously make the guiding tube 723 move along upward with the conic bottom end 7232 in pressing contact with the tapered inner wall of the through hole 7241 of the bolt-like member 724. Thus the steel balls 725 will be pushed inward in the radial direction to limit the further upward motion of the cable 2 by frictional clamping; and the harder the upward pull force is, the tighter the cable 2 will be held in place by steel balls.

As shown in FIG. 3, the pivotal brake units 5 are operatively connected to each other by a suspension cable 4 which is engaged with the suspension member 71A by locating part of the suspension cable 4 in the groove 711 of the first type suspension member 71A.

Referring to FIG. 2, the second type suspension member 71B, having an oval-shaped hole 713 disposed near the bottom end of the vertical wall thereof, in replacement of the groove 711 of the first type suspension member 71A, is equipped with a cable fixing assembly 73 including a bolt 731 having a cable passage hole 7311 disposed near the bolt head thereof, a cable suspension ring member 734 on the periphery of which is disposed a groove 7341, a washer 733, and a nut 732.

The bolt 731 and cable suspension ring member 734 are located on one side of the vertical wall member of the suspension member 71B with the washer 733 and nut 732 disposed on the other side thereof, all of which are placed in alignment with the oval-shaped hole 713 so that the related components can be integrally mounted to the suspension member 71B as shown in FIGS. 4, 5, 6. The suspension cable 4 is held by the cable suspension ring member 734 in place with the cable in registry with the groove 7341 thereof. The brake actuating cable 2 is guided through the adjustment assembly 72 and further through the passage hole 7311 of the bolt 731.

In practical use, once the brake actuating cable 2 is lifted upward as a result of the operation on a bicycle brake handle, the suspension cable 4 will be brought to move along upwardly, causing both the pivotal brake units 5 to pivot at the same time. Thus the friction pads 51 begin to be brought into frictional contact with the rims of a wheel 6 effecting the braking operation. The adjustment of the tension of the brake actuating cable 2 is achieved simply by pushing down the guiding tube 723 and pulling the cable in either direction accordingly.

It now becomes clear that the present invention has the following advantages over the conventional bicycle brake operating system:

1. The adjustment of the brake actuating cable can be easily performed without the help of any hand tools.
2. The cable suspension member of the present invention will not be tilted due to long term operation, because of the adoption of the cable fixing assembly of the invention which is in cooperation with the cable adjustment assembly.
3. The brake operation on the bicycle wheels can be performed in a more normal manner because the brake units of the present invention are actuated in a more symmetric manner with the friction forces evenly applied on the wheels.
4. The friction pads of the bicycle brakes can be more readily replaced by proper release of the brake actuating cable.

What is claimed is:

1. A bicycle brake cable tension adjustment device comprising:

a suspension member having a horizontal wall with a through hole disposed thereon, and a vertical wall the bottom end of which is reversely bended upward toward said horizontal wall to form a groove;

an adjustment assembly which comprises:

a tubular casing having threads disposed on the inner wall thereof, the bottom end of which is disposed a reduced through hole with the periphery of said hole forming a flange portion;

a coil spring located in said tubular casing and on said flange portion at the bottom thereof;

a bolt-like member having a flanged head and external threads which engage with the inner threads of said tubular casing to join the two together, a through hole being disposed along the axial direction of said bolt-like member with the inner wall thereof defined in tapered form, and the diameter of said through hole increasing from the top to the bottom;

a guiding tube having a conic bottom end being located within said through hole of said bolt-like member and on top of said coil spring with the conic bottom end in operative abutment with said tapered inner wall of said through hole, two or more through bores disposed on said conic bottom end and in communication with said guiding tube for receiving two or more steel balls therein; said tubular casing and said bolt-like member being screwed together and disposed through said hole on the horizontal wall of said suspension member with the flanged head of said bolt-like member in supporting relation with the periphery of said hole; a brake actuating cable being guided through said adjustment assembly and also through said guiding tube; said steel balls being in contact with said actuating cable, once the cable is being pulled upward said guiding tube will be brought along to move upward, making said conic bottom end in tight abutment with said tapered wall of said bolt-like member, thus pushing the steel balls radially inward to tightly hold said cable in place; by pushing down said guiding tube to release said conic bottom end from engagement with said tapered inner wall, permitting said steel balls to release said cable, thereby the cable can be pulled in either direction for adjustment.

2. A bicycle brake cable tension adjustment device as claimed in claim 1 wherein said suspension member has a vertical wall and a horizontal wall, on said horizontal wall is disposed a through hole and near the bottom end of said vertical wall is provided a through hole for mounting a cable fixing assembly which comprises:

a bolt near the head of which being disposed a through hole for passage of said brake actuating cable;

a cable suspension ring member having a groove defined on the periphery thereof;

a washer;

a nut;

said bolt and cable suspension ring member and said washer and nut being disposed in alignment with said through hole on the vertical wall of said suspension member for integral assembly with said bolt and said cable suspension ring member disposed on one side of said suspension member and said washer and said nut on the other.

* * * * *